July 21, 1964
W. R. CROOKS
3,141,293
METHOD AND APPARATUS FOR REFRIGERATING COMBUSTION
AIR FOR INTERNAL COMBUSTION ENGINES
Filed Aug. 22, 1961
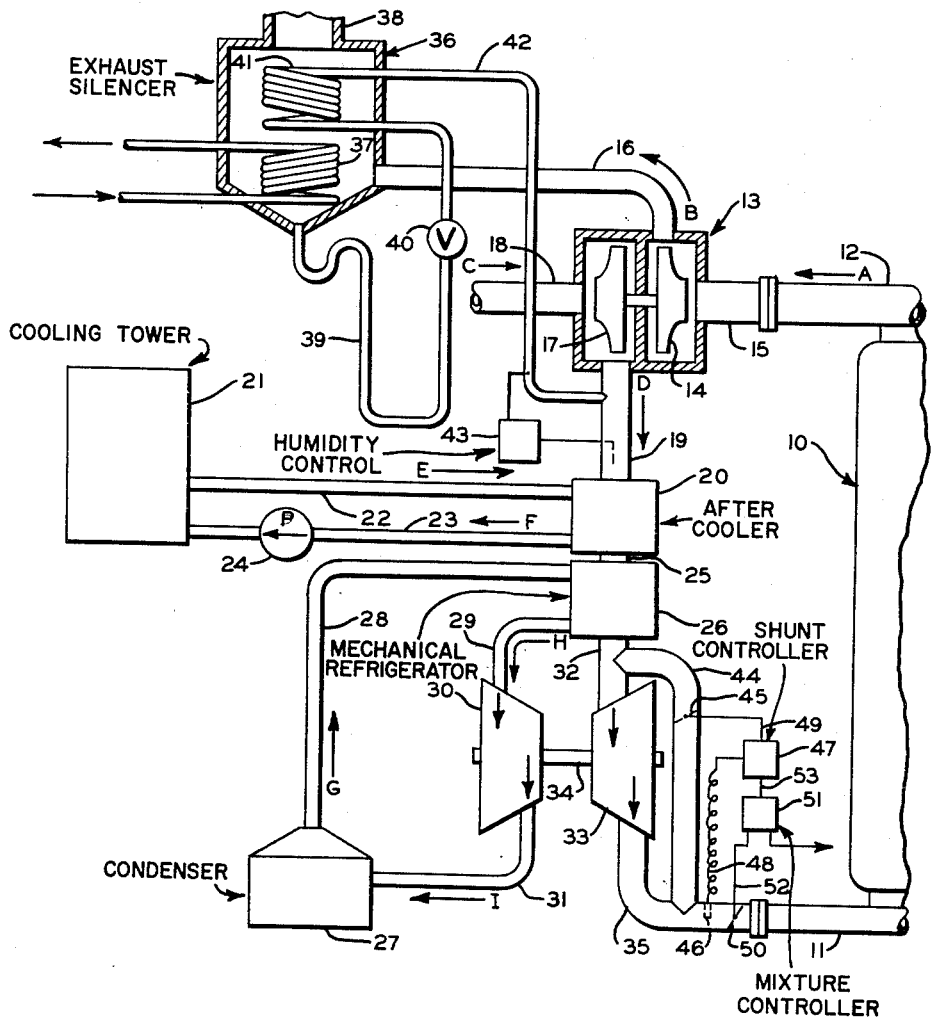
INVENTOR.
WILLIAM R. CROOKS
BY
ATTORNEYS United States Patent Office 3,141,293
Patented July 21, 1964

3,141,293
METHOD AND APPARATUS FOR REFRIGERATING COMBUSTION AIR FOR INTERNAL COMBUSTION ENGINES
William R. Crooks, Mount Vernon, Ohio, assignor to The Cooper-Bessemer Corporation, Mount Vernon, Ohio, a corporation of Ohio
Filed Aug. 22, 1961, Ser. No. 133,148
9 Claims. (Cl. 60—13)

This invention relates to a method and apparatus for conditioning the combustion air for internal combustion engines.

When an internal combustion engine is supercharged the combustion air is heated by the work expended upon it as it is compressed, and it has long been recognized that it is desirable to cool this air because cooler combustion air inhibits detonation. The cooler air enables more power to be developed in a given engine because such air has a greater density which makes more oxygen available for the combustion of an increased fuel charge, and improves the operation of the engine by enabling the fuel to obtain more readily the necessary oxygen for combustion.

This cooling is customarily accomplished by using air-to-water heat exchangers such as evaporative coolers or tube-type aftercoolers. One such system is shown in U.S. Patent No. 2,600,736 in which air for combustion is drawn through an evaporative tower, cooling the water and air both to near the wet bulb temperature. The cooled water at the base of the tower is circulated through a shell and tube cooler which removes a considerable portion of the heat of compression added to the air by a turbocharger that originally compressed the air. The relative humidity of the air entering the engine from such a system is considerably below the saturation point.

While conventional systems are satisfactory for ordinary installations, aftercoolers that utilize water as a heat exchange medium are incapable of cooling the combustion air to low enough temperatures. Various devices have been proposed to further cool the compressed combustion air as it leaves the aftercooler. In some installations the air is passed through a mechanical refrigerator that utilizes a condensable refrigerant, and the refrigerator may be either an absorption type or a compression type.

An absorption type refrigerator may use exhaust heat from the engine, but a large amount of condenser cooling is required. Also such refrigerators are bulky in size and have a high initial cost. A compression type refrigerator may be driven either from the engine drive shaft, which does not give optimum results, or from the supercharger which tends to make the supercharger slow in response to sudden load changes because of the added inertia of the refrigerator compressor.

In other installations the combustion air may be partially re-expanded as it leaves the aftercooler to achieve greater cooling as in the case of a turbocooler. However, neither the mechanical refrigerator nor the expander are capable of drastically lowering the temperature of the combustion air from the aftercooler to near freezing to obtain additional gains in thermal efficiency and engine power output.

It is, therefore, an object of the present invention to provide an improved method and apparatus for refrigerating the combustion air of an internal combustion engine which cools the air to near freezing regardless of the ambient temperature.

Another object of the invention is to provide an improved method and apparatus for conditioning combustion air to obtain not only additional thermal efficiency but also increased brake mean effective pressures in an internal combustion engine.

A further object of the invention is to provide an improved refrigerated air system for internal combustion engines which injects steam into compressed combustion air and conserves a major portion of the latent heat of vaporization of the entrained water during subsequent cooling of the air to near or below freezing temperatures.

A still further object of the invention is to provide a combustion air conditioning system for an internal combustion engine which obtains its energy from the exhaust gases from the engine whereby all benefits of refrigeration are utilized to increase the engine output and reduce fuel consumption.

Still another object of the invention is to provide an improved refrigerated air system for internal combustion engines which utilizes available energy in the compressed air from a turbocharger to drive a compressor for a chemical refrigerant.

Other objects of the invention will be apparent from the drawing and specification which follow wherein like numbers are used throughout to identify like parts.

In the drawing, the single figure is a diagrammatic illustration showing a schematic representation of the combustion air conditioning and refrigerating system constructed according to the invention.

In order to achieve the objects of the invention, an internal combustion engine having means, such as a turbocharger, for compressing the combustion air, and an aftercooler for removing heat from the compressed combustion air is provided with a mechanical refrigerator for removing additional heat from the compressed air as this air is discharged from the aftercooler. Also, expansion means in the form of an expansion turbine is provided for cooling the compressed air to near or below freezing after it is discharged from the refrigerator, and this turbine is used to drive a compressor in the refrigerator circuit. The combustion air is conditioned by injecting steam removed from the exhaust gases from the engine after the air leaves the turbocharger and before it is refrigerated.

Referring now to the drawing, there is shown an internal combustion engine 10 having a combustion air manifold 11 and an exhaust manifold 12. The internal combustion engine 10 is customarily a spark ignited gas engine, but it is also equally applicable to a compression-ignition type such as a diesel engine.

A suitable turbocharger 13 is driven by exhaust gases that are discharged from the exhaust manifold 12. The turbocharger 13 includes a turbine portion 14 having a gas conduit 15 that is coupled to the exhaust manifold 12 and a discharge line 16 extending therefrom. The turbocharger 13 further includes a compressor portion 17 that is coupled to the turbine portion 14, and as the exhaust gases are discharged from the engine 10 through the exhaust manifold 12 and the conduit 15 in the direction of the arrow A the turbine portion 14 is turned by these gases as they move to the discharge line 16 in the direction of the arrow B. The compressor portion 17 is thereby rotated to move air through an intake conduit 18 in the direction of the arrow C to a conduit 19, and upon entering this conduit as indicated by the arrow D the compressed combustion air contains a considerable amount of energy which was imparted to it from the turbocharger 13 during compression. The compressed combustion air in the conduit 19 may have a temperature between 200° F. and 215° F. and a pressure of between 25 and 30 inches Hg.

The compressed combustion air in the conduit 19 moves from the turbocharger 13 to a conventional aftercooler 20 such as a water-tube type that has a liquid heat exchange medium. The water is supplied to the aftercooler 20 from a reservoir, such as a cooling tower 21, through a liquid supply line 22 in the direction of the arrow E shown in FIG. 1, and the ambient temperature of this water may be as high as 100° F. The water is circulated in the tubes of the aftercooler 20, and after it has removed heat from the compressed combustion air, the heated water, at a temperature of approximately 120° F., leaves the aftercooler 20 through a liquid discharge line 23 in the direction of the arrow F whereupon it is circulated back to the cooling tower 21 by a pump 24. The cooled combustion air leaves the aftercooler 20 through a suitable conduit 25, and in large engines the temperature of the air in this conduit may be between 90° F. and 130° F.

The combustion air in the conduit 25 at the discharge side of the aftercooler 20 is passed through a compression type mechanical refrigerator 26 which preferably utilizes a fluorocarbon as a refrigerant. The refrigerator 26 is of the type which expands the refrigerant that is supplied from a condenser 27 through a refrigerant line 28 in the direction of the arrow G. The expanded or evaporated refrigerant is discharged from the refrigerator 26 through the line 29 as indicated by the arrow H into a compressor 30 whereupon it is compressed and transmitted to the condenser 27 through a line 31 as shown by the arrow I.

The compressed combustion air which has been further cooled by the refrigerator 26 to around 43° F. is discharged therefrom into a conduit 32 whereupon it moves into a radial expander turbine 33 that is coupled to the compressor 30 by a shaft 34. In driving the turbine 33 at a speed of approximately 20,000 r.p.m., the compressed air is permitted to expand to a larger volume and a lesser pressure. The energy removed from this compressed air during expansion is utilized to drive the compressor 30, and the air is cooled as much as 23° F. This refrigerated air leaves the expander turbine 33 through a conduit 35 that is coupled to the combustion air manifold 11, and the temperature of the air in this manifold is near or below freezing, i.e. between 27° F. and 32° F. In a typical installation utilizing a 6000 horsepower supercharged gas engine, the compressed combustion air contained sufficient surplus energy to drive a 125 ton capacity refrigerant compressor, and 25 tons of additional refrigeration was extracted in driving this compressor with an expander turbine.

The use of the expander turbine 33 as a source of power conserves most of the latent heat of evaporation of entrained water in the combustion air which condenses when the combustion air manifold pressure is increased and the temperature of the air is lowered to near freezing. In a typical system this manifold pressure may be increased to 46 inches Hg absolute as the air temperature is lowered to 35° F.

Another feature of the invention is the utilization of "fog cooling" to lower the engine cylinder temperature by about 100° F. and control the peak firing pressure by evaporating minute droplets of free water that were formed during the expansion cooling in the turbine 33 during compression in the engine cylinders. More particularly, considerable quantities of the water entrained as water vapor in the combustion air are released as free water in the form of microscopic, fog-like particles when passing through the expander turbine 33 where the air temperature is suddenly reduced to approximately 20° F. These smoke-sized water particles are so small that they remain floating in the air until re-evaporated on the compression stroke inside the engine cylinder, and do not condense as ice even when supercooled. Under maximum summer temperature conditions, the conservation of the heat of evaporation in the aforementioned installation utilizing a 6000 horsepower engine is more effective than 80 tons of added refrigeration, and the total combined effect of the cooling in such a system is more than 230 tons. In addition to cooling the air and driving the compressor 30, the turbine 33 also serves as a mechanical atomizer because any condensate formed on the aftercooler 20 or in the evaporator coils of the refrigerator 26 is delivered near the root section of the turbine blades which disburse the droplets mechanically.

An exhaust silencer 36 is provided in the discharge line 16, and a water cooled coil 37 therein condenses water vapor in the exhaust gases that are emitted by the engine 10. The exhaust gases are then discharged to the atmosphere through a suitable line 38. The moisture removed from the exhaust gases runs into a pipe 39 and constitutes a water supply for the aforementioned "fog cooling" in the event the moisture content of the air entering the intake conduit 18 is not sufficiently high in dry areas, or during the winter months, to provide approximately 100 grains of condensate per pound of air. The water in the pipe 39 flows through a valve 40 to a steam coil 41 of a waste heat boiler where it is converted to steam by the heat from the exhaust gases.

Dry steam from the waste heat boiler at a maximum rate of approximately 2 gallons per minutes may be supplied through a fluid line 42 to the compressed combustion air in the conduit 19 as it is discharged from the turbocharger 13. By introducing the moisture into the combustion air as steam, the piping is kept at a minimum and the scale problem inherent with the use of water is removed. The humidity of the compressed combustion air in the conduit 19 is maintained at the desired level by a suitable control device 43 that is operably connected to the line 42 and has a moisture sensing element disposed in the conduit 19.

Sudden load increases of at least 25% of rated load must be accommodated very quickly for the satisfactory operation of most installations, and this is accomplished by imposing a controlled restriction between the turbocharger 13 and the manifold 11 to insure a turbocharger discharge pressure that is about 75% higher than the supply manifold pressure for the proper fuel-air ratio at any given load. In the present system the turbine 33 serves as this restriction, and a by-pass conduit 44 is used to circumvent the expander turbine 33 in the event of a sudden load or an excessive temperature drop. The by-pass conduit 44 connects the conduit 32 from the refrigerator 26 directly to the conduit 35 that is connected to the combustion air manifold 11. A normally closed valve 45 in the by-pass conduit 44 directs the combustion air through the expander turbine 33 under normal operating conditions. A thermostat 46 is set at a desired temperature, say 35° F., for the compressed combustion air to be supplied to the manifold 11, and the thermostat is electrically connected to a shunt controller 47 through a lead 48. The controller 47 is operably connected to the valve 45 by any suitable device such as a mechanical linkage or lead 49 if the valve is electrically operated. If the temperature in the conduit 35 drops below the desired temperature at which the thermostat 46 is set, the shunt controller 47 is actuated to open the valve 45 and by-pass the expander turbine 33.

The fuel-air mixture is controlled by a valve 50 in the conduit 35 that is connected to a mixture controller 51 through a line 52. The mixture controller 51 is also connected to the shunt controller 47 by a line 53, and in response to a demand for more air because of a sudden load, the mixture controller 51 signals the shunt controller 47 to open the valve 45 thereby increasing the flow of compressed combustion air to the conduit 35. The mixture controller 51 is a conventional element used on presently known gas engines.

In order to illustrate the advantages of the invention, a comparison between various parameters relating to the same engine having a turbocooled supercharger before and after the conditioning of the combustion air according to the invention is set forth below:

| Item | Before Refrigeration | After Refrigeration |
|---|---|---|
| Rated Brake Mean Effective Pressure | 165 | 200 |
| Revolutions per Minute | 327 | 360 |
| Rated Horsepower | 4,520 | 6,000 |
| Fuel, B.t.u./H.P.–Hr | 6,150 | 5,900 |
| Firing Pressure, p.s.i | 1,000 | 1,000 |
| Compression Ratio | 11.3:1 | 10.3:1 |
| Compression Pressure, p.s.i | 560 | 520 |
| Calculated Temp. at End of Compression, Deg. F. | 825 | 700 |
| Firing Pressure Rise Above Compression, p.s.i | 440 | 480 |
| Turbocharger Discharge Press., in. Hg | 20 | 30 |
| Turbocharger Discharge Temp., Deg. F | 195 | 215 |
| Turbo Discharge Temp. Rise Above Ambient | 95 | 115 |
| Ambient Temperature, Deg. F | 100 | 100 |
| Wet Bulb Temperature, Deg. F | 82 | 82 |
| Aftercooler Water Temp., Deg. F. max | 120 | 120 |
| Air Manifold Temp., Deg. F | 95 | 35 |
| Air Manifold Press., in. Hg | 10 | 16.5 |
| Air Flow, c.f.m | 9,300 | 13,000 |
| Air Temp. to Aftercooler, Deg. F | 195 | 215 |
| Air Temp. from Aftercoller, Deg. F | 130 | 130 |
| Heat Removed by Aftercooler, B.t.u./Min | 10,750 | 18,400 |
| Tons of Cooling by Aftercooler | 53.7 | 92.0 |
| Air Temp.¹ from Refrig. Evap., Deg. F | | 65.0 |
| Air Temp. from Expander Turbine, Deg. F | 95 | 35.0 |
| Heat Removed by Evap., B.t.u.'s | | 27,800 |
| Heat Removed by Expansion, B.t.u.'s | 6,600 | 4,600 |
| Heat Removed by Refrigeration, Effect—Tons | 33 | 162 |
| Refrigeration Available from Turbocharging System in Tons | 33 | 210 |
| Total Capacity of Combustion Air Cooling System in Tons | 86.7 | 302 |

¹ Temp. controlled to prevent freezing of water in combustion air.

The above comparison shows that the system of the invention not only eliminates detonation but also provides a 25 percent increase in specific engine output without increasing the peak firing pressure together with a 4 percent decrease in specific fuel consumption. Inasmuch as the size of the engine crankshaft is determined by the peak firing pressure the increased horsepower can be obtained from a given engine without structural alterations.

While the preferred embodiment of the invention has been described various modifications may be made to the disclosed structure without departing from the spirit of the invention or the scope of the subjoined claims.

I claim:

1. In combination with an internal combustion engine having means for compressing the combustion air and an aftercooler for removing heat from the compressed combustion air; the improvement comprising refrigerating means for removing additional heat from the compressed combustion air as said air is discharged from said aftercooler, and air expansion means for further cooling the compressed combustion air after discharge from said refrigerating means.

2. In combination with an internal combustion engine having means for compressing the combustion air and an aftercooler for removing heat therefrom; the improvement comprising a mechanical refrigerator for removing additional heat from the air after discharge from said aftercooler, said refrigerator being of the compression type including a refrigerant evaporator at the discharge side of said aftercooler and a refrigerant compressor for receiving refrigerant from said evaporator, expansion means for cooling the air after discharge from said refrigerator, and coupling means for operatively connecting said expansion means to said refrigerant compressor in driving relationship.

3. In an internal combustion engine having means for compressing the combustion air and cooling means for removing heat from the compressed combustion air; the improvement comprising means for injecting steam into the compressed combustion air between said compressing means and said cooling means to saturate the same, and additional cooling means for removing more heat from the saturated combustion air after discharge from said first mentioned cooling means to lower the temperature of said air to near freezing thereby condensing said steam into fog while conserving a major portion of the latent heat of vaporization thereof.

4. In an internal combustion engine having means for compressing the combustion air and an aftercooler for removing heat from the compressed combustion air; the improvement comprising means for injecting steam into the compressed combustion air at the intake side of said aftercooler, refrigerating means at the discharge side of said aftercooler for removing additional heat from the compressed combustion air, and expansion means for cooling the compressed combustion air after discharge from said refrigerating means to near freezing for condensing the steam therein into fog and conserving a major portion of the latent heat of vaporization thereof.

5. In apparatus as in claim 4, wherein a portion of the refrigerating means is driven by said expansion means.

6. In an internal combustion engine having a combustion air manifold and an exhaust manifold, means for compressing the combustion air for said combustion air manifold, said means being driven by gases from said exhaust manifold, and an aftercooler for removing heat from the air from said compressing means, the improvement comprising means for removing water vapor from the exhaust gases from said exhaust manifold and introducing the same into the compressed combustion air between said compressing means and said aftercooler, a refrigerator at the discharge side of said aftercooler for removing additional heat from the compressed combustion air, said refrigerator including a refrigerant evaporator and a refrigerant compressor for receiving refrigerant from said evaporator, an expander turbine at the discharge side of said refrigerator for receiving combustion air therefrom, said expander turbine being coupled in driving relationship with said refrigerant compressor.

7. A method of cooling the combustion air for an internal combustion engine, comprising the steps of compressing the combustion air using energy from the engine exhaust gases, cooling the air after it has been compressed by passing it sequentially through an aftercooler and a refrigerator, and expanding the air from the refrigerator to a reduced temperature after it has been cooled while using the energy derived from the expanding step to drive the refrigerator.

8. A method of conditioning the combustion air for an internal combustion engine, comprising the steps of compressing the combustion air using energy from the engine exhaust gases, saturating the air by injecting moisture from the exhaust gases into said air, passing the saturated air sequentially through an aftercooler and a refrigerator, and expanding the air from the refrigerator to a reduced temperature after it has been cooled while using the energy derived from the expanding step to drive the refrigerator.

9. A method of cooling the combustion air for an internal combustion engine having a turbocharger connected thereto, comprising the steps of cooling the air from the turbocharger by passing the same through an aftercooler, refrigerating the air from the aftercooler by passing the same through a refrigerator, and expanding the air from the refrigerator to fruther cool the air while using the energy derived therefrom to drive the refrigerator.

References Cited in the file of this patent

UNITED STATES PATENTS

| | | |
|---|---|---|
| 2,571,256 | King | Oct. 16, 1951 |
| 2,678,532 | Miller | May 18, 1954 |
| 2,703,560 | Lieberherr | Mar. 8, 1955 |
| 2,703,561 | Froehlick | Mar. 8, 1955 |
| 2,766,744 | Steiger | Oct. 16, 1956 |
| 2,877,622 | Antonissen | Mar. 17, 1959 |
| 2,994,187 | Kelgard | Aug. 1, 1961 |